Oct. 5, 1926.                    1,602,155

M. P. HOLMES
WHEEL
Filed July 24, 1923

Inventor:
Morris P. Holmes.
by
Atty.

Patented Oct. 5, 1926.

1,602,155

UNITED STATES PATENT OFFICE.

MORRIS P. HOLMES, OF CLAREMONT, NEW HAMPSHIRE, ASSIGNOR TO SULLIVAN MACHINERY COMPANY, A CORPORATION OF MASSACHUSETTS.

WHEEL.

Application filed July 24, 1923. Serial No. 653,593.

My invention relates to wheels.

An object of my invention is to provide an improved wheel. A further object of my invention is to provide an improved truck wheel having improved, simplified, and rugged means for attaching the same to an axle and whereby the whole mechanism is made readily accessible. These and other objects and advantages will, however, hereinafter more fully appear.

In the accompanying drawings I have shown for purposes of illustration one form which my invention may assume in practice.

In these drawings:—

Figure 1:
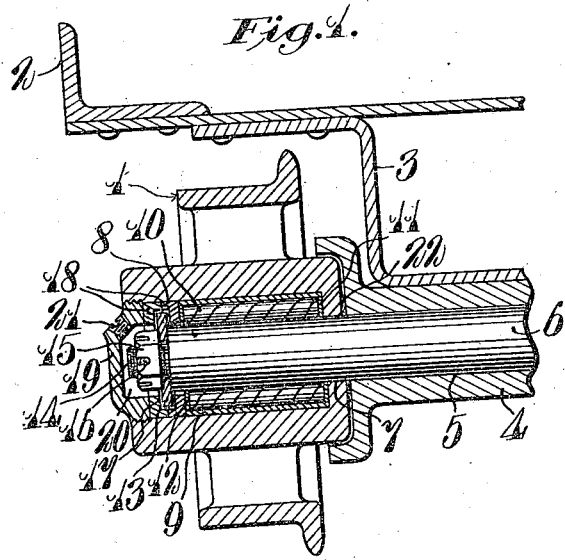
Fig. 1 is a vertical sectional view of my improved wheel in position on a truck.
Figure 2:
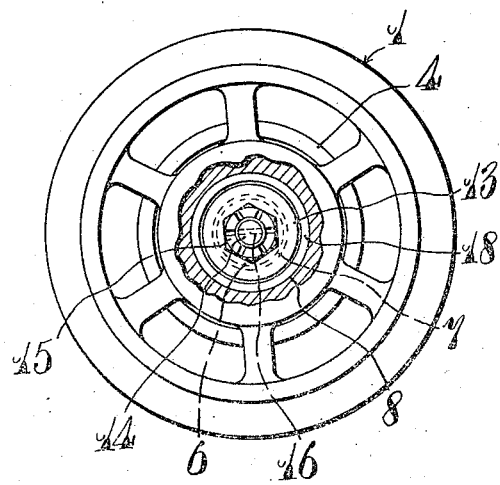
Fig. 2 is a side elevation, partially broken away to facilitate illustration, of the wheel shown in Fig. 1.

In this illustrative construction I have shown my improved truck wheel, generally designated 1, used in connection with a mine car having a body 2 and a supporting frame 3 to which an axle housing 4 is suitably rigidly secured. Mounted in the housing in a bore 5 is an axle 6, which may be rotatable or stationary as preferred, the wheel being operatively connected thereto and mounted thereupon in an improved manner and through improved means hereinafter described.

The wheel 1 may be of any suitable or standard construction and is provided with an enlarged hub in which is formed a suitable bore 7 through which the axle 6 passes and an axially disposed bore or chamber 8 of greater diameter than the diameter of the axle. In this chamber and disposed between the axle and a bearing sleeve 9 are suitable antifriction bearings, herein in the form of roller bearings 10. As shown, the ends of these bearings 10 are suitably spaced from the ends of the chamber 8 by means of washers 11 and 12, the construction being such that the rollers and the washers are disposed within the sleeve 9.

Operatively connected to the wheel 1 and the axle 6 is provided improved means for connecting and interlocking these elements, retaining the bearings 10 in position, and receiving the wear during service. These means preferably include, as shown, a washer 13 suitably carried on a reduced portion 14 formed integral with the axle. This washer is suitably held in position by a lock nut 15 threaded onto a threaded portion of the reduced portion 14, and is further secured thereto by means of a locking pin 16. As shown, this member 13 is disposed in a recess 17 formed by the uniting of a pair of flanged disc-shaped thrust receiving members 18 disposed in the chamber 8. Herein attention is also directed to the fact that these members 18 and the bearings 10 are held in position within the chamber 8 by means of a cap member 19 suitably threaded into the outer end of the bore 8, this cap member herein being provided with an oil chamber 20 communicating with the bearings through the recess 17 and also being provided with an oil inlet filler plug 21 so that this chamber may be conveniently filled when desired. An oil retaining member, herein a felt washer 22, is provided between the hub of the wheel 1 and the housing member 4 for preventing the oil from leaking past the bore 7.

In the use of my improved construction, when it is desired to remove the members 18 and 13 or the bearings for any reason, it is only necessary to remove the cap 19 and the lock nut 15 and pull off the entire wheel and its cooperating parts as a unit from the axle, the parts then becoming readily accessible. In reassembling the parts, the wheel is shoved onto the axle, the lock nut threaded in position securing the washer between the flanged rings 18 and the cap threaded in place, whereupon the parts are held in the desired assembled relation. Obviously, the wheel may be lubricated whenever desired by filling the chamber 20 with oil, the construction being such that the lubricant may have free access to all of the moving parts.

As a result of my improved construction, it will be noted that practically all the end thrust of the axles is received upon the washer 13 and this member is readily removable as desired, the construction being such that a new washer may be substituted with great facility and at a comparatively low cost. Attention is also directed to the fact that by means of my improved construction, it is possible to produce a wheel of a rugged and simplified type composed of a relatively few inexpensive parts which may be replaced at a small expense and with facility, the construction being simple and of a type which may be manufactured with a minimum of machine work, or special complicated parts.

While I have in this application specifically described one form which my invention may assume in practice, it will be understood that this form of the same is shown for purposes of illustration and that the invention may be modified and embodied in other forms without departing from its spirit or the scope of the appended claims.

What I claim as new and desire to secure by Letters Patent is:

1. In combination, an axle, a wheel thereon, and means for securing said wheel in position on said axle including an annular member secured in coaxial relation to said axle, a plurality of flanged members cooperating to form a recess in which said annular member is enclosed and a member outside said annular member and secured to said wheel, said last member and said wheel cooperating to enclose a chamber in which said annular members and said flanged members are enclosed.

2. In combination, an axle, a wheel thereon provided with a bore, bearings in said bore between said wheel and axle, and means to secure said wheel in position on said axle including a plurality of members cooperating to form a recess, a washer secured coaxially to said shaft and disposed in said recess, said members and washer being disposed in said bore, and closure means for said bore holding said members and thereby said bearings in position.

3. In combination, an axle, a wheel thereon, and means for securing said wheel in position on said axle including a detachable washer carried by said axle and a plurality of members carried by said wheel engageable with the opposite surfaces of the outer edges of said washer.

4. In combination, an axle, a wheel thereon, and means for securing said wheel in position including a washer disposed on a reduced threaded portion formed on said axle, a nut disposed on said threaded portion, means to lock said nut in position thereon, a plurality of flanged members cooperating to form a recess in which said washer is disposed, and a cap member threaded into a bore in said wheel for holding said elements in position.

5. In combination, an axle, a wheel thereon having a bored hub and bearing disposed in said bore, a collar carried by said axle, a plurality of flanged members engageable with said collar, and a cap threaded in the outer end of said bore for clamping said bearing and said flanged members in position.

6. In combination, an axle having a reduced portion, a wheel journaled thereon, and means for securing said wheel on said axle including an annular member disposed on the reduced portion of the latter, and a pair of contacting flanged elements housing said member.

7. In combination, an axle having a reduced portion, a wheel journaled on said axle provided with a bore, and means for securing said wheel on said axle including a ring-like member disposed on the reduced portion of said axle, and a pair of annular flanged elements disposed in said bore and housing said member.

8. In combination, an axle having a reduced portion, a wheel journaled on said axle provided with a bore, and means for securing said wheel on said axle including a ring-like member disposed on the reduced portion of said axle, a pair of annular flanged elements disposed in said bore and housing said member, and means for holding said elements in position.

In testimony whereof I affix my signature.

MORRIS P. HOLMES.